US012418118B2

(12) United States Patent
Lee et al.

(10) Patent No.: US 12,418,118 B2
(45) Date of Patent: Sep. 16, 2025

(54) ANTENNA STRUCTURE AND DISPLAY DEVICE INCLUDING THE SAME

(71) Applicant: DONGWOO FINE-CHEM CO., LTD., Jeollabuk-do (KR)

(72) Inventors: Won Hee Lee, Gyeonggi-do (KR); Young Ju Kim, Gyeonggi-do (KR); Min Soo Seo, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 205 days.

(21) Appl. No.: 18/109,370

(22) Filed: Feb. 14, 2023

(65) Prior Publication Data

US 2023/0275362 A1 Aug. 31, 2023

(30) Foreign Application Priority Data

Feb. 25, 2022 (KR) ........................ 10-2022-0024938

(51) Int. Cl.
*H01Q 21/08* (2006.01)
*H01Q 1/24* (2006.01)
*H01Q 1/36* (2006.01)

(52) U.S. Cl.
CPC ............ *H01Q 21/08* (2013.01); *H01Q 1/243* (2013.01); *H01Q 1/36* (2013.01)

(58) Field of Classification Search
CPC .......... H01Q 21/08; H01Q 1/22; H01Q 1/243; H01Q 1/38; H01Q 1/36; H01Q 21/065; H01Q 9/0407; H01Q 1/24; H01Q 1/2291; H01Q 1/44; H01Q 1/46; H01Q 1/50; H01Q 21/28; H01Q 21/30; G01S 13/62; G01S 7/03
See application file for complete search history.

(56) References Cited

U.S. PATENT DOCUMENTS

| | | | | |
|---|---|---|---|---|
| 10,622,703 B2* | 4/2020 | Hong | ..................... | H01Q 1/243 |
| 2020/0201470 A1* | 6/2020 | Oh | ..................... | H01Q 1/44 |
| 2020/0243959 A1* | 7/2020 | Ryu | ..................... | H01Q 9/0407 |
| 2020/0259245 A1* | 8/2020 | Kim | ..................... | H01Q 1/243 |
| 2023/0006356 A1* | 1/2023 | Yoon | ..................... | H01Q 9/065 |
| 2023/0052092 A1* | 2/2023 | Choi | ..................... | H01Q 23/00 |

FOREIGN PATENT DOCUMENTS

| | | | | |
|---|---|---|---|---|
| EP | 2 608 217 A1 | | 6/2013 | |
| JP | 2010-151611 A | | 7/2010 | |
| KR | 10-2011-0123592 A | | 11/2011 | |
| KR | 10-1816414 B1 | | 1/2018 | |
| KR | 10-1900839 B1 | | 9/2018 | |
| KR | 10-2020-0038797 A | | 4/2020 | |
| KR | 10-2021-0031361 A | | 3/2021 | |
| KR | 10-2258794 B1 | | 5/2021 | |
| WO | WO-2021118198 A1 | * | 6/2021 | ............... H01Q 5/42 |
| WO | WO-2021261630 A1 | * | 12/2021 | ............... H01Q 1/38 |

* cited by examiner

*Primary Examiner* — Hoang V Nguyen
(74) *Attorney, Agent, or Firm* — The PL Law Group, PLLC

(57) ABSTRACT

An antenna structure includes a first radiator group including a plurality of first radiators arranged in a first direction, a second radiator group including a plurality of second radiators arranged in a second direction perpendicular to the first direction, first transmission lines connected to each of the first radiators at the same layer as that of the first radiators, and second transmission lines connected to each of the second radiators at the same layer as that of the second radiators.

16 Claims, 8 Drawing Sheets

ANTENNA STRUCTURE AND DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2022-0024938 filed on Feb. 25, 2022 in the Korean Intellectual Property Office, the entire disclosure of which is incorporated herein by reference for all purposes.

BACKGROUND

1. Technical Field

The present invention relates to an antenna structure and a display device including the same. More particularly, the present invention relates to an antenna structure including a plurality of radiators and a display device including the same.

2. Description of the Related Art

As information technologies have been developed, a wireless communication technology such as Wi-Fi, Bluetooth, etc., or a non-contact type sensing technology such as a gesture sensing, a motion recognition, etc., may be employed or embedded in an image display device, an electronic device, an architecture, etc.

As mobile communication technologies has been recently developed, an antenna for performing, e.g., communications in high-frequency or ultra-high frequency band may be coupled to various mobile devices.

Specifically, a wireless communication technology is combined with a display device and implemented in the form of, e.g., a smart phone. In this case, an antenna may be coupled to the display device to perform a communication function.

As the display device in which the antenna is employed becomes thinner and lighter, a space for an occupation of the antenna may also be decreased. Accordingly, the antenna may be included on a display panel in the form of a film or patch to be accommodated in a limited space.

However, when the antenna is disposed on a display panel, a coaxial circuit for transmitting and receiving a signal or a power supply may not be easily constructed. Further, sensitivity may be degraded due to the separate coaxial feeding circuit, or space efficiency and aesthetic characteristics of a structure to which an antenna device is applied may also be degraded.

For example, Korean Published Patent Application No. 10-2014-0104965 discloses an antenna device including an antenna element and a ground element.

SUMMARY

According to an aspect of the present invention, there is provided an antenna structure having improved signaling efficiency and radiation reliability.

According to an aspect of the present invention, there is provided an image display device including the antenna structure.

(1) An antenna structure, including: a first radiator group including a plurality of first radiators arranged in a first direction; a second radiator group including a plurality of second radiators arranged in a second direction perpendicular to the first direction; first transmission lines connected to each of the first radiators at the same layer as that of the first radiators; and second transmission lines connected to each of the second radiators at the same layer as that of the second radiators.

(2) The antenna structure according to the above (1), wherein the first radiator group and the second radiator group are disposed at the same layer.

(3) The antenna structure according to the above (1), wherein the first radiator group and the second radiator group share one radiator.

(4) The antenna structure according to the above (1), wherein the number of first radiators and the number of second radiators are the same.

(5) The antenna structure according to the above (1), further including a third radiator spaced apart from the first radiator group and the second radiator group.

(6) The antenna structure according to the above (5), wherein the third radiator serves as a transmission radiator, and the first radiator group and the second radiator group serve as reception radiators.

(7) The antenna structure according to the above (1), further including a dielectric layer on which the first radiator group and the second radiator group are disposed, wherein the first direction is inclined by a first tilting angle with respect to a length direction of the dielectric layer, and the second direction is inclined by a second tilting angle with respect to the length direction of the dielectric layer.

(8) The antenna structure according to the above (7), wherein each of the first tilting angle and the second tilting angle is in a range from 30° to 60°.

(9) The antenna structure according to the above (7), wherein the first radiator group includes two first radiators, and the second radiator group includes two second radiators.

(10) The antenna structure according to the above (9), wherein a ratio of a length difference between the second transmission lines relative to a length difference between the first transmission lines is in a range from 0.8 to 1.2.

(11) The antenna structure according to the above (7), further including: a first signal pad electrically connected to one end portion of each of the first transmission lines; and a second signal pad electrically connected to one end portion of each of the second transmission lines.

(12) The antenna structure according to the above (11), wherein the first signal pad and the second signal pad are arranged to form a single row in a third direction, and the first direction and the second direction are inclined by the first tilting angle and the second tilting angle, respectively, with respect to the third direction.

(13) The antenna structure according to the above (11), further including: a pair of first ground pads spaced apart from the first signal pad and disposed with the first signal pad interposed therebetween; and a pair of ground pads spaced apart from the second signal pad and disposed with the second signal pad interposed therebetween.

(14) The antenna structure according to the above (1), wherein the first radiators and the second radiators have a mesh structure.

(15) The antenna structure of the above (14), further including a dummy mesh pattern spaced apart from the first radiators and the second radiators around the first radiators and the second radiators.

(16) The antenna structure according to the above (1), further including an antenna unit spaced apart from the first radiators and the second radiators, wherein the antenna unit has a resonance frequency different from that of the first radiators and the second radiators.

(17) A motion recognition sensor including the antenna structure according to the above-described embodiments.

(18) A radar sensor including the antenna structure the above-described embodiments.

(19) A display device, including: a display panel; and the antenna structure according to the above-described embodiments disposed on the display panel.

(20) The display device according to the above (19), wherein the first direction is inclined by a first tilting angle with respect to a length direction of the display panel, and the second direction is inclined by a second tilting angle with respect to the length direction of the display panel.

According to embodiments of the present invention, a first radiator group included in an antenna structure may include a plurality of radiators arranged in a first direction, and a second radiator group may include a plurality of radiators arranged in a second direction perpendicular to the first direction. Accordingly, a signal intensity of the radiators in the first direction and a signal intensity of the radiators in the second direction may be respectively sensed.

The first direction and the second direction may be inclined at a predetermined tilting angle with respect to one side of a dielectric layer or one side of a display panel. Accordingly, a length of the transmission line connected to each of first radiators may be relatively shortened, and thus signal transmission speed and efficiency may be improved. Further, the transmission line may be extended in a straight line without a bending area, so that signal loss and reduction may be prevented.

Further, a ratio of a length deviation between the second transmission lines to a length deviation between the first transmission lines may be adjusted within a predetermined range. Accordingly, a signal imbalance in the first and second directions may be prevented, and a motion or gesture sensing performance in all directions may be improved by the antenna structure.

The antenna structure may be electrically connected to a motion sensor circuit or a radar processor through a circuit board. Accordingly, a signal change by a sensing target may be transmitted to the motion sensor circuit or the radar processor, and a motion or a distance of the sensing target may be detected.

DETAILED DESCRIPTION

According to exemplary embodiments of the present invention, an antenna structure including a plurality of radiator groups arranged in different directions is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first", "second", "third", "one end", "other end", "top surface", "bottom surface", etc., are not intended to designate an absolute position or order, but relatively used to distinguish different elements or parts.

Figure 1:
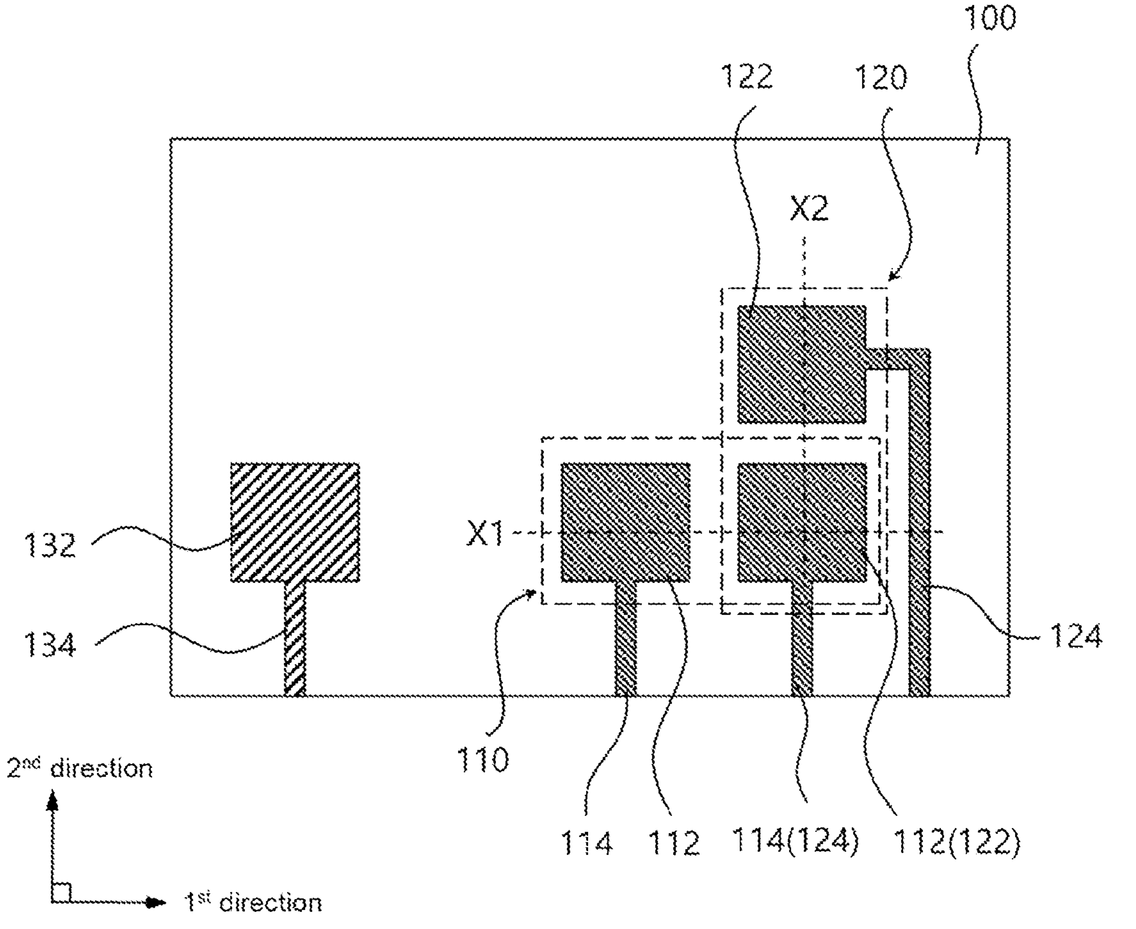
FIG. 1 is a schematic plan view illustrating an antenna structure in accordance with exemplary embodiments.

FIG. 1 is a schematic plan view illustrating an antenna structure in accordance with exemplary embodiments.

Referring to FIG. 1, the antenna structure may include a dielectric layer 100, and a first radiator group 110, a second radiator group 120, a first transmission line 114 and a second transmission line 124 formed on the dielectric layer 100.

The dielectric layer 100 may include, e.g., a transparent resin material. For example, the dielectric layer 100 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

In some embodiments, an adhesive film such as an optically clear adhesive (OCA), an optically clear resin (OCR), etc., may be included in the dielectric layer 100.

In some embodiments, the dielectric layer 100 may include an inorganic insulating material such as silicon oxide, silicon nitride, silicon oxynitride, glass, or the like.

In an embodiment, the dielectric layer 100 may be provided as a substantially single layer.

In an embodiment, the dielectric layer 105 may include a multi-layered structure of at least two or more layers. For example, the dielectric layer 100 may include a base layer and an antenna dielectric layer, and may include an adhesive layer between the base layer and the antenna dielectric layer.

Impedance or inductance may be formed by the dielectric layer 100, so that a frequency band for operating or driving the antenna structure may be adjusted. In some embodiments, a dielectric constant of the dielectric layer 100 may be adjusted in a range from about 1.5 to 12. If the dielectric constant exceeds about 12, a driving frequency may be excessively reduced, and driving in a desired high frequency or ultra-high frequency band may not be implemented.

The first radiator group 110 may include a plurality of first radiators 112 arranged in a first direction. For example, the first radiators 112 may be spaced apart from each other along a first axis X1 extending in the first direction. The first axis X1 may be defined as an imaginary straight line passing through centers of the first radiators 112 and extending in the first direction.

The second radiator group 120 may include a plurality of second radiators 122 arranged in a second direction. For example, the second radiators 122 may be spaced apart from each other along a second axis X2 extending in the second direction. The second axis X2 may be defined as an imaginary straight line passing through centers of the second radiators 122 and extending in the second direction.

Accordingly, a signal intensity of the first radiator group 110 in the first direction and a signal intensity of the second radiator group 120 in the second direction may be changed according to a position of a sensing object.

Each of the first radiators 112 and each of the second radiators 122 may be driven independently from each other. Thus, the change in the signal intensity according to the position or distance of the sensing object may be measured in the first direction and the second direction, respectively, and thus motion, gesture and distance of the sensing object may be sensed.

In exemplary embodiments, the first direction and the second direction may perpendicularly cross each other. Accordingly, the antenna structure may sense the change of the signal intensity in the two orthogonal axes X1 and X2 and may transmit the detected change to a motion sensor driving circuit or a radar processor. Based on the collected information, the driving circuit or processor may measure distances or motions in all directions on, e.g., an X-Y coordinate system.

In some embodiments, the first radiators 112 may be arranged with a constant interval. For example, a spacing distance in the first direction between adjacent first radiators 112 may be the same as each other.

In some embodiments, the second radiators 122 may be arranged with a constant interval. For example, a spacing distance in the second direction between adjacent second radiators 122 may be the same as each other.

The signal intensity in the first direction or the second direction may be measured per a constant distance by the first radiators 112 and the second radiators 122 disposed with the constant interval. Accordingly, for example, the change of the signal intensity in the first direction or the second direction according to the change in the position of the sensing object may be more accurately measured.

In an embodiment, the spacing distance between the first radiators 112 in the first direction may be the same as the spacing distance between the second radiators 122 in the second direction.

In some embodiments, the first radiator group 110 and the second radiator group 120 may share one radiator 112 and 122. For example, the first radiator group 110 and the second radiator group 120 may share a common radiator 112 and 122 disposed in an area where a first axis X1 and a second axis X2 intersect.

The common radiator 112 and 122 may serve as a reference point for measuring the change of the signal intensity in the first and second directions. For example, the change in the position of the sensing object may be sensed by measuring the changes of the signal intensities in the first axis X1 and the second axis X2 based on the signal intensity of the common radiator 112 and 122.

In some embodiments, the number of first radiators 112 and the number of second radiators 122 may be the same. For example, the first radiator group 110 and the second radiator group 120 may include the same number of radiators. In this case, measurement of the signal change in the first direction and the signal change in the second direction may be balanced, and sensitivity and sensing performance in the first direction and the second direction may be improved together.

In some embodiments, each of the radiators 112 and 122 may be designed to have a resonance frequency of high or ultra-high frequency bands corresponding to, e.g., 3G, 4G, 5G or higher bands. For example, the resonance frequency of each of the radiators 112 and 122 may be about 50 GHz or more, specifically from 50 GHz to 80 GHz, and more specifically from 55 GHz to 77 GHz.

The antenna structure may include transmission lines connected to the radiators 112 and 122. The transmission line may transfer a driving signal or a power from an antenna driving integrated circuit (IC) chip to the radiator, and may transfer an electromagnetic wave signal or electrical signal of the radiator to the antenna driving IC chip or the motion sensor driving circuit.

The transmission line may include a first transmission line 114 connected to the first radiator 112 and a second transmission line 124 connected to the second radiator 122.

The first transmission line 114 may be disposed at the same layer as that of the first radiator 112. For example, the first transmission line 114 may be integrally connected to the first radiator 112 and extend from one end of the first radiator 112.

The second transmission line 124 may be disposed at the same layer as that of the second radiator 122. For example, the second transmission line 124 may be integrally connected to the second radiator 122 and extend from one end of the second radiator 122.

In an embodiment, the first transmission line 114 may be provided to each of the first radiators 112, and the second transmission line 124 may be provided to each of the second radiators 122.

In some embodiments, the first transmission line 114 and the second transmission line 124 may be disposed at the same level as that of the first radiator group 110 and the second radiator group 120 on the dielectric layer 100. The transmission lines 114 and 124 may be arranged at the same level as that of the radiators 112 and 122, so that an additional coaxial feeding for signal input/output and feeding may not be required. For example, an antenna on display (AOD) in which the antenna structure is placed on a display panel may be implemented.

In some embodiments, the antenna structure may further include a third radiator 132 spaced apart from the first radiator group 110 and the second radiator group 120.

The third radiator 132 may serve as a transmission radiator for a motion sensing, and may radiate a radio wave toward the sensing object. The first radiator 112 and the second radiator 122 may serve as reception radiators, and may receive the radio wave reflected from the sensing target.

Accordingly, the antenna structure may receive and transmit wireless signals for the sensing object, and ae motion sensor may measure attenuation or increase of the signal based on a position change and a distance of the sensing object.

In an embodiment, the antenna structure may include a third transmission line 134 electrically connected to the third radiator 132. The third transmission line 134 may be disposed at the same layer or level as that of the third radiator 132.

In some embodiments, one end portions of the transmission lines 114, 124 and 134 may be connected to the radiator 112, 122 and 132, and the other end portions of the transmission lines 114, 124 and 134 may be bonded to a circuit board.

The circuit board may include, e.g., a flexible printed circuit board (FPCB). For example, a conductive bonding structure such as an anisotropic conductive film (ACF) may be bonded onto the other end portions of the transmission lines 114 and 124, and then the circuit board may be pressed onto the conductive bonding structure.

The antenna driving IC chip may be mounted on the circuit board. In an embodiment, an intermediate circuit board such as a rigid printed circuit board may be disposed between the circuit board and the antenna driving IC chip. In an embodiment, the antenna driving IC chip may be directly mounted the a circuit board.

In an embodiment, the motion sensor driving circuit may be mounted on the circuit board. For example, the antenna structure and the circuit board are electrically connected, so that signal transmission/reception information of the antenna structure may be transferred to the motion sensor driving circuit. Accordingly, a motion recognition sensor including the antenna structure may be provided.

In some embodiments, a ground layer may be formed on a bottom surface of the dielectric layer 100. Generation of an electric field in the transmission line may be more promoted through the ground layer, and an electrical noise around a feeding line may be absorbed or shielded.

In some embodiments, the ground layer may be included as an individual component of the antenna structure. In some embodiments, a conductive member of a display device in which the antenna structure is employed may serve as the ground layer.

The conductive member may include, e.g., various wires such as a gate electrode of a thin film transistor (TFT) included in a display panel, a scan line or a data line, or various electrodes such as a pixel electrode and a common electrode.

In an embodiment, a metallic member such as a SUS plate, a sensor member such as a digitizer, a heat dissipation sheet, etc., disposed at a rear portion of the image display device may serve as the ground layer.

Figure 2:
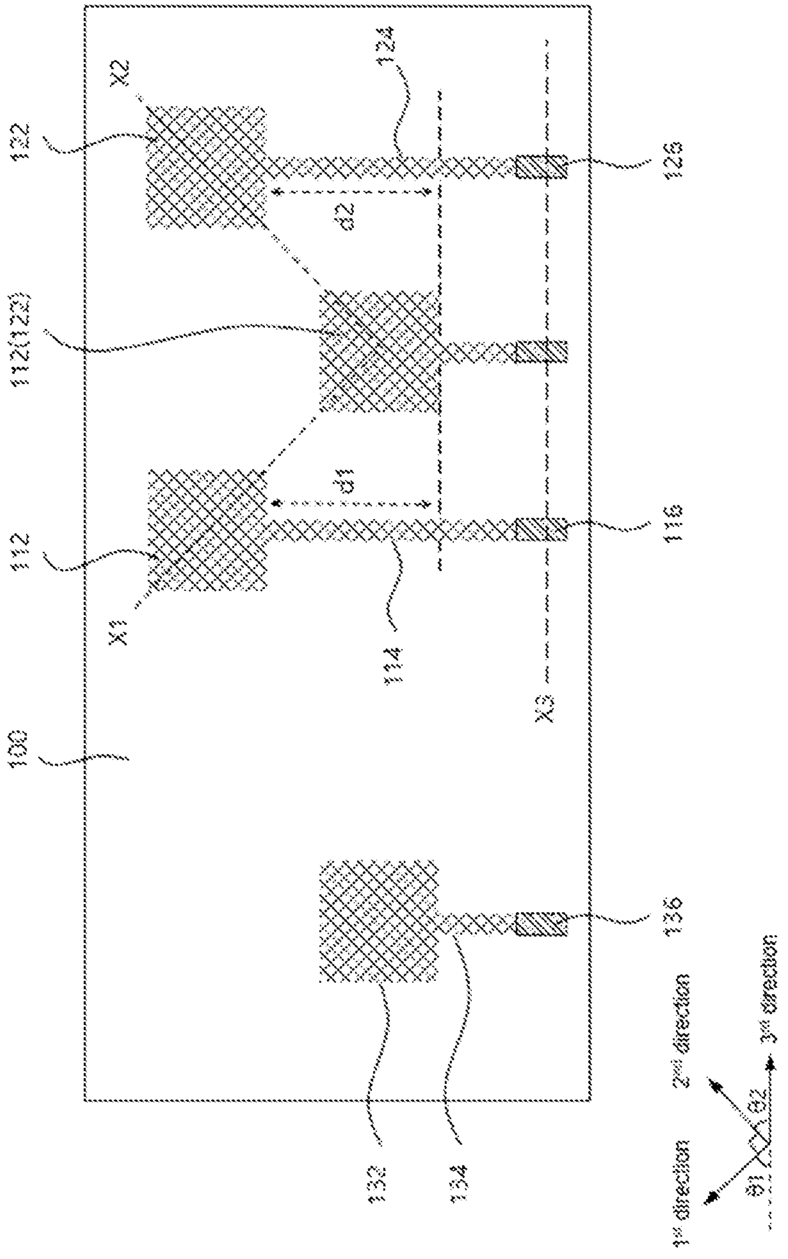
FIGS. 2 and 3 are schematic plan views illustrating an antenna structure in accordance with exemplary embodiments.

FIG. 2 is a schematic plan view illustrating an antenna structure according to exemplary embodiments.

Referring to FIG. 2, the first direction and the second direction may be inclined at a predetermined tilting angle with respect to a length direction or a width direction of the dielectric layer 100.

The term “width direction” as used herein may refer to a horizontal direction of the dielectric layer 100 in FIGS. 1 to 5, and may refer to, e.g., a third direction. The term “length direction” as used herein may mean a vertical direction perpendicular to the horizontal direction of the dielectric layer 100 in FIGS. 1 to 5.

For example, the first direction may be inclined at a first tilting angle θ1 with respect to the length direction or the width direction of the dielectric layer, and the second direction may be inclined at a second tilting angle θ2 with respect to the length direction or the width direction of the dielectric layer.

The radiators 112 and 122 may be arranged to be oblique with respect to a lateral side of the dielectric layer 100 to reduce a length difference between the transmission lines 114 and 124 connected to the radiators 112 and 122.

If the length difference between the transmission lines 114 and 124 connected to the radiators 112 and 122 becomes increased, a resistance and a signal line loss may be increased to deteriorate sensitivity and signal efficiency. Accordingly, an accuracy of a signal input to each of the radiators 112 and 122 and an electromagnetic wave signal emitted from each of the radiators 112 and 122 may be degraded, and a signal with respect to the sensing object may be inaccurately measured to cause measurement errors of the position and distance.

Further, if the length difference between the first transmission lines 114 and the length difference between the second transmission lines 124 are different from each other, a signal sensitivity in the first direction and a signal sensitivity in the second direction may become different. Thus, measurement of the change of the position change and distance along two axes may become inaccurate, and gesture and motion sensing performance may be degraded.

In exemplary embodiments, the first radiator group 110 and the second radiator group 120 may be disposed to be inclined with the predetermined tilting angle with respect to the length direction or the width direction of the dielectric layer 100, so that the length of the transmission line may be reduced to prevent the increase of the signal loss and the resistance.

Additionally, the length difference between the transmission lines 114 and 124 connected to the radiators 112 and 122 may be reduced, so that the sensitivity difference in the first axis and the second axis may also be reduced. Thus, the change of the signal intensity based on the motion of the sensing object may be more accurately measured.

In some embodiments, the first transmission line 114 may extend in a straight line from the first radiator 112. In some embodiments, the second transmission line 124 may extend in a straight line from the second radiator 122.

The transmission lines 114 and 124 may extend in a straight line, so the signal loss and noise generation due to bent or folded portions may be prevented. Accordingly, signal transmission/reception efficiency and sensitivity of the radiator groups 110 and 120 may be improved, and the accuracy of the motion and gesture detection may be improved.

In some embodiments, the first tilting angle θ1 and the second tilting angle θ2 may be in a range from 15° to 75° or from 30° to 60°, respectively. Within the above range, the first radiator group 110 and the second radiator group 120 may be symmetrically disposed at the same plane, so that the length difference between the first transmission lines 114 and the length difference between the second transmission lines 124 may be reduced.

Preferably, the first tilting angle θ1 and the second tilting angle θ2 may be 45°.

In an embodiment, the first transmission line 114 and the second transmission line 124 may extend to be parallel to each other. For example, the first transmission lines 114 and the second transmission lines 124 each extend in straight lines from one side of the radiators, and may be arranged along the length direction or the width direction (the third direction) of the dielectric layer.

In this case, each of the first direction and the second direction may be inclined by the tilting angle with respect to an arrangement direction of the transmission lines 114 and 124.

In some embodiments, each of the first radiator group 110 and the second radiator group 120 may include a plurality of radiators. For example, each radiator group may include two or three radiators.

Referring to FIG. 2, the first radiator group 110 may include two first radiators 112, and the second radiator group 120 may include two second radiators 122.

In some embodiments, the first radiator group 110 and the second radiator group 120 may share one radiator. For example, the first radiator group 110 and the second radiator group 120 may each consist of three radiators.

Accordingly, an area occupied by the radiators 112 and 122 and the transmission lines 114 and 124 may be reduced. Thus, the antenna structure can be miniaturized and integrated while having improved signal transmission and reception efficiency and motion sensing performance.

In an embodiment, a ratio of the length difference d2 between the second transmission lines 124 relative to the length difference d1 between the first transmission lines 114 may be in a range from 0.8 to 1.2, or from 0.9 to 1.1.

Within the above range, signal sensitivities in the first and second directions may be maintained as being similar to each other, and measurement errors due to the difference of signal sensitivities in each direction may be reduced.

Preferably, the length difference d1 between the first transmission lines 114 and the length difference d2 between the second transmission lines 124 may be substantially the same.

The radiators 112 and 122 and the transmission lines 114 and 124 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

In an embodiment, the radiators 112 and 122 and the transmission lines 114 and 124 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the radiators 112 and 122 and the transmission lines 114 and 124 may include a transparent conductive oxide such as indium tin oxide (ITO), indium zinc oxide (IZO), zinc oxide (ZnOx), indium zinc tin oxide (IZTO), etc.

In some embodiments, the radiators 112 and 122 and the transmission lines 114 and 124 may include a stacked structure of a transparent conductive oxide layer and a metal layer. For example, the radiators 112 and 122 and the transmission lines 114 and 124 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In an embodiment, the radiators 112 and 122 and the transmission lines 114 and 124 may include a metamaterial.

The radiators 112 and 122 and the transmission lines 114 and 124 may include a blackened portion, so that a reflectance at surfaces of the radiators 112 and 122 and the transmission lines 114 and 124 may be decreased to suppress a visual pattern recognition due to a light reflectance.

In an embodiment, a surface of the metal layer included in radiators 112 and 122 and the transmission lines 114 and 124 may be converted into a metal oxide or a metal sulfide to form a blackened layer. In an embodiment, a blackened layer such as a black material coating layer or a plating layer may be formed on the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

The antenna structure may further include a signal pad. For example, the signal pads may include a first signal pad 116 connected to a terminal end portion of the first transmission line 114 and a second signal pad 126 connected to a terminal end portion of the second transmission line 124.

In one embodiment, the signal pads 116 and 126 may be provided as substantially integral members with the transmission lines 114 and 124. For example, the distal ends of the transmission lines 114 and 124 may be provided as signal pads 116 and 126.

In some embodiments, a ground pad may be disposed around the signal pads 116 and 126. For example, a pair of first ground pads may be disposed to face each other with the first signal pad 116 interposed therebetween. For example, a pair of second ground pads may be disposed to face each other with the second signal pad 126 interposed therebetween. The ground pad may be electrically and physically separated from the transmission lines 114 and 124 and the signal pads 116 and 126.

In some embodiments, the first signal pads 116 and the second signal pads 126 may be arranged in the width direction or the length direction of the dielectric layer 100, and may be arranged, e.g., in the third direction.

For example, the first signal pads 116 and the second signal pads 126 may be spaced apart from each other along a third axis X3 extending in the third direction. The third axis X3 may be defined as an imaginary straight line passing through the centers of the signal pads and extending in the third direction.

The first radiator group 110 and the second radiator group 120 may each be inclined at a predetermined tilt angle with respect to the arrangement direction of the signal pads 116 and 126.

In an embodiment, the circuit board may be bonded together on the signal pads 116 and 126 and the other end portions of and the transmission lines 114 and 124. The ground pads may be arranged around the signal pads 116 and 126, so that bonding stability of the circuit board can be further improved.

In some embodiments, the antenna structure may include a third signal pad 136 electrically connected to one end portion of the third transmission line 134. In an embodiment, the third signal pad 136 may be provided as a substantially integral member with the third transmission line 134. For example, a terminal end portion of the third transmission line 134 may be provided as the third signal pad 136.

In an embodiment, the antenna structure may include a pair of third ground pads disposed to face each other with the third signal pad 136 interposed therebetween.

In an embodiment, the antenna structure may include only one third radiator 132. For example, the one third radiator 132 may be provided for one first radiator group 110 and one second radiator group 120.

In one embodiment, the antenna structure may include a plurality of third radiators 132. For example, the plurality of third radiators 132 may be spaced apart from the first radiators 112 and the second radiators 122 around the first radiator group 110 and the second radiator group 120.

Figure 3:
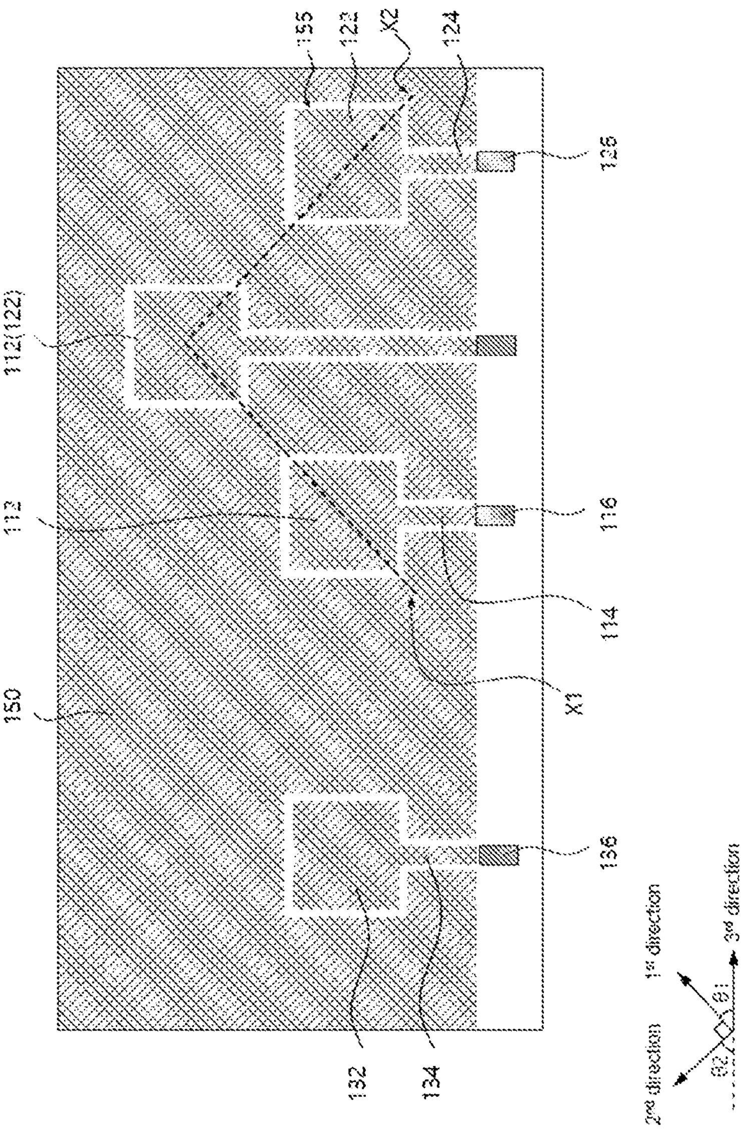

FIG. 3 is a schematic plan view illustrating an antenna structure in accordance with exemplary embodiments.

Referring to FIG. 3, the antenna structure may further include a dummy mesh pattern 150 disposed around the first radiator group 110 and the second radiator group 120. For example, the dummy mesh pattern 150 may be electrically and physically separated from the radiators 112, 122 and 132 and the transmission lines 114, 124 and 134 by a separation region 155.

For example, a conductive layer including the metal or alloy as described above may be formed on the dielectric layer 100. A mesh structure may be formed while the conductive layer is etched along a profile of the radiators 112, 122 and 132 and the transmission lines 114, 124 and 134. Accordingly, the dummy mesh pattern 150 spaced apart from the radiators 112, 122 and 132 and the transmission lines 114, 124 and 134 may be formed by the separation region 155.

In some embodiments, the radiators 112, 122 and 132 and the transmission lines 114, 124 and 134 may include a mesh structure. Accordingly, transmittance of the antenna structure may be improved, and optical properties around the radiators 112, 122 and 132 may become uniform by the dummy mesh pattern 150. Thus, the antenna structure may be prevented from being visually recognized.

In an embodiment, the radiators 112 and 122 and the transmission lines 114 and 124 may entirely include the mesh structure. In an embodiment, at least a portion of the transmission lines 114 and 124 may include a solid structure for a feeding efficiency.

In an embodiment, the signal pad and the ground pad may be formed as a solid metal pattern to reduce a feeding resistance through the circuit board and prevent signal loss.

Figure 4:
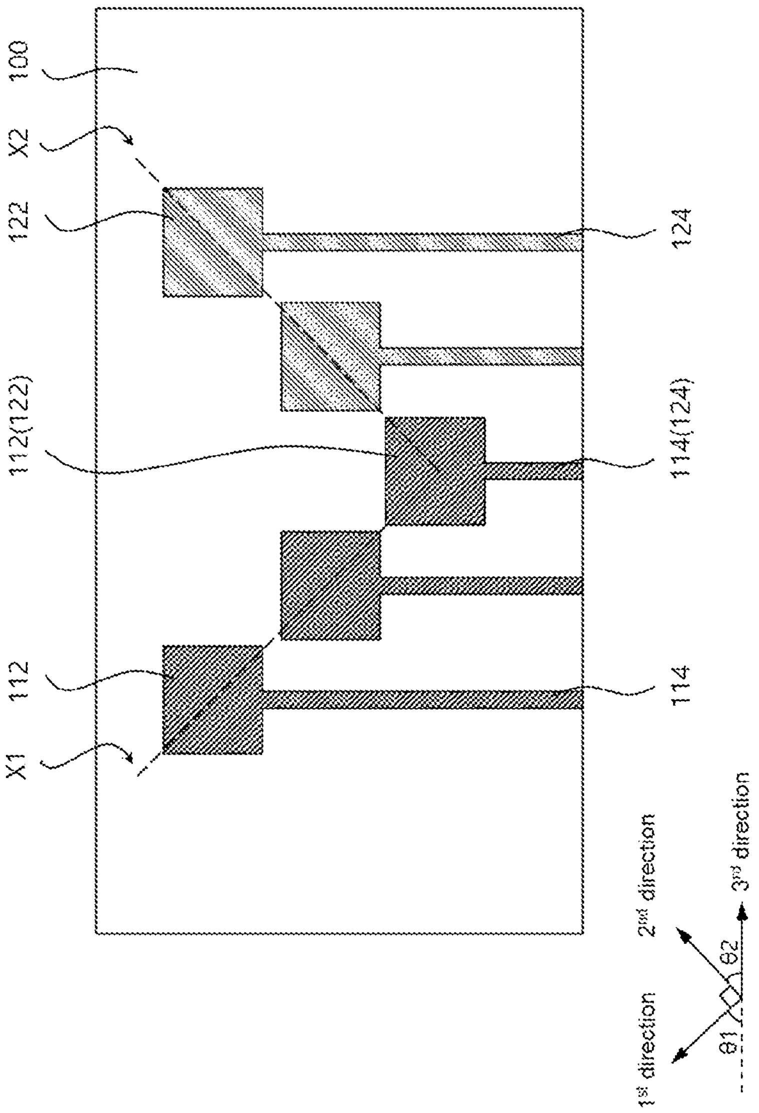
FIGS. 4 and 5 are schematic plan views illustrating an antenna structure in accordance with exemplary embodiments.
Figure 5:
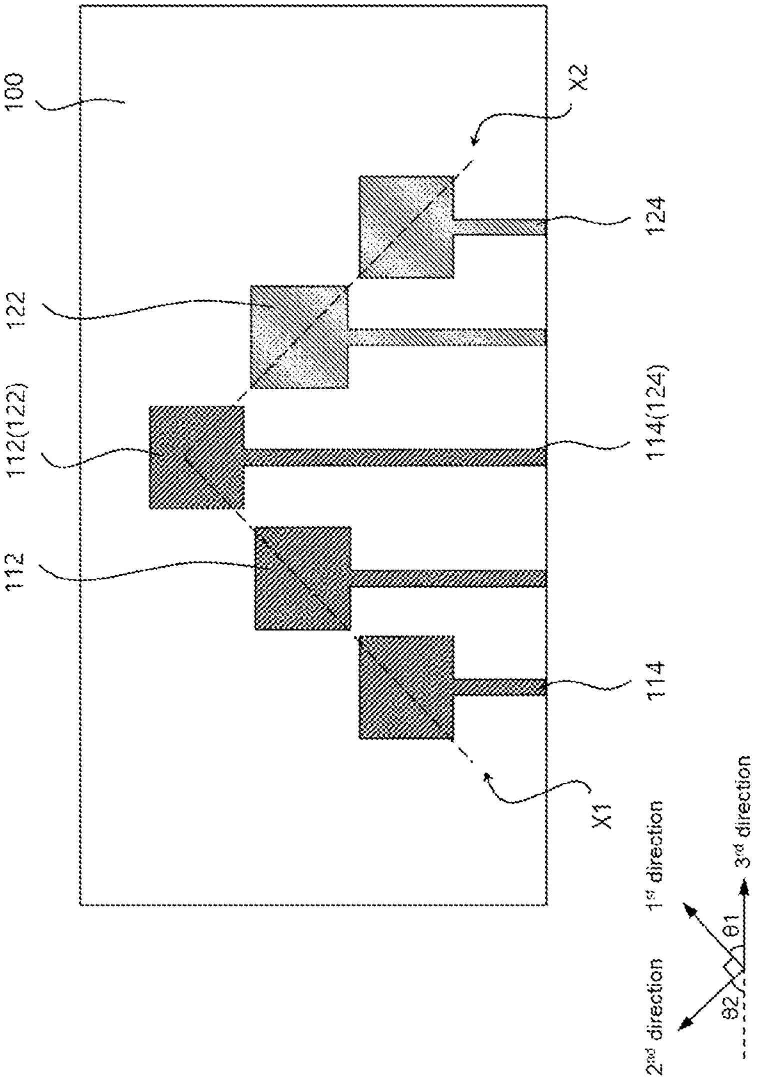

FIGS. 4 and 5 are schematic plan views of an antenna structure in accordance with exemplary embodiments.

Referring to FIGS. 4 and 5, the first radiator group 110 may include three first radiators 112, and the second radiator group 120 may include three second radiators 122.

In some embodiments, the first radiator group 110 and the second radiator group 120 may share one radiator. In this case, the first radiator group 110 and the second radiator group 120 may entirely include five radiators.

Referring to FIG. 4, the transmission line connected to the radiator disposed at an intersection of the first axis X1 and the second axis X2 may have the shortest length.

Referring to FIG. 5, the transmission line connected to the radiator disposed at the intersection of the first axis X1 and the second axis X2 may have the longest length.

Figure 6:
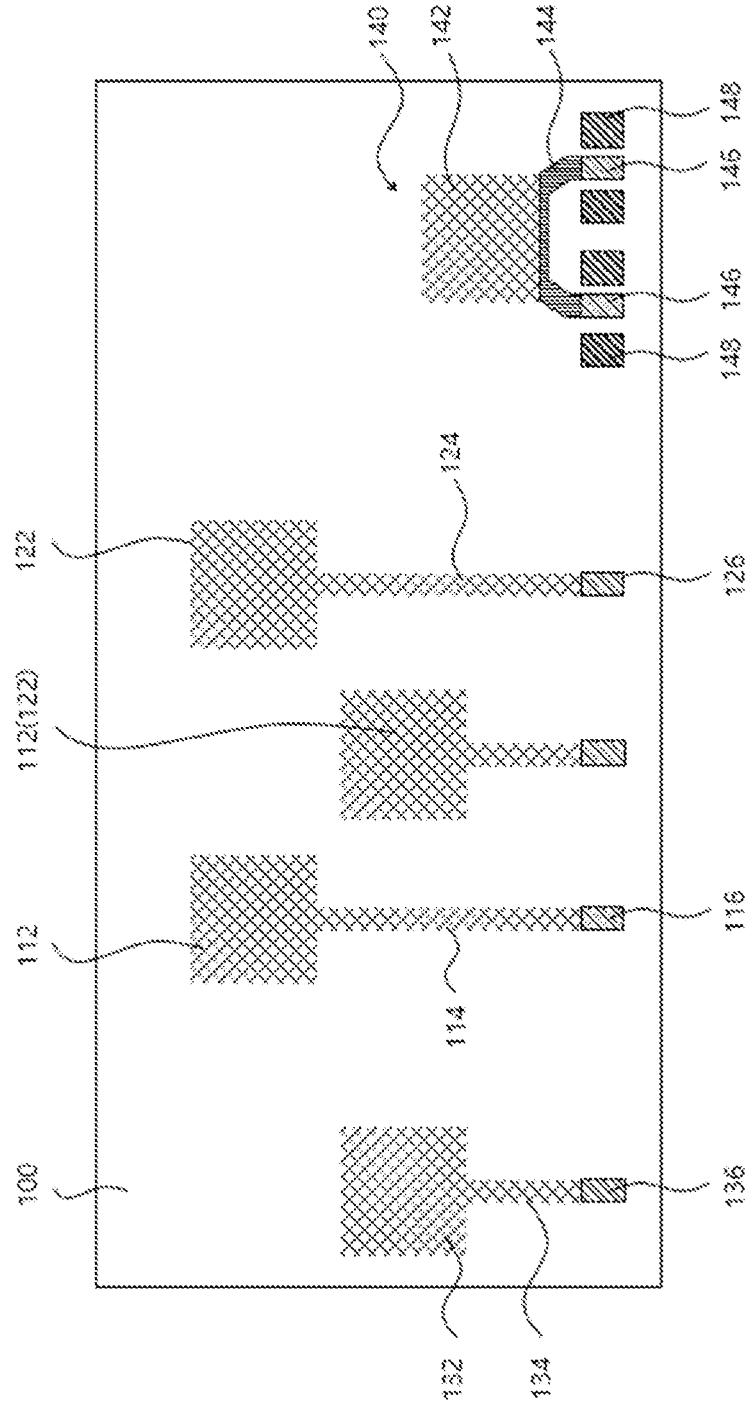
FIG. 6 is a schematic plan view illustrating an antenna structure in accordance with exemplary embodiments.

FIG. 6 is a schematic plan view of an antenna structure in accordance with exemplary embodiments.

Referring to FIG. 6, the antenna structure may further include an antenna unit 140 spaced apart from the first radiator 112, the second radiator 122 and the third radiator 132.

The antenna unit 140 may have a resonance frequency different from that of the first radiator 112 and the second radiator 122. Accordingly, a signal radiation for the motion detection and an electromagnetic wave radiation for a communication may be implemented together in one antenna structure.

The antenna unit 140 may be used for a mobile communication in a high frequency or an ultra-high frequency band, and may transmit and receive signals in, e.g., 3G, 4G, 5G or higher frequency bands. For example, the resonance frequency of the antenna unit 140 may be in a range from about 20 to 45 GHz.

In an embodiment, the antenna unit 140 may be disposed at the same layer or at the same level as that of the first radiator 112 and the second radiator 122 on the dielectric layer 100.

The antenna unit 140 may include a fourth radiator 142 and a fourth transmission line 144 connected to the fourth radiator 142. The fourth radiator 142 may have, e.g., a polygonal plate shape.

In some embodiments, a plurality of fourth transmission lines 144 may be connected to one fourth radiator 142. Accordingly, a plurality of polarization directions may be substantially provided.

For example, each of the two fourth transmission lines 144 may be connected to two vertexes of a lower side of the fourth radiator 142. In this case, a feeding may be performed in two substantially orthogonal directions to the fourth radiator 142 through each of the fourth transmission lines 144. Accordingly, dual polarization properties may be implemented from one radiator 142. For example, vertical radiation and horizontal radiation properties may be implemented together from the antenna unit 140.

In an embodiment, the antenna unit 140 may include a fourth signal pad 146 connected to one end portion of the fourth transmission line 144, and a plurality of fourth ground pads 148 facing each other with the fourth signal pad 146 interposed therebetween.

In one embodiment, two fourth ground pads 148 may be disposed between the fourth signal pads 146. For example, two fourth ground pads 148 facing each other with the fourth signal pad 146 therebetween may be provided to each of the fourth signal pads 146.

In an embodiment, one fourth ground pad 148 may be disposed between the fourth signal pads 146. For example, the fourth signal pads 146 adjacent to each other may share one fourth ground pad 148.

In some embodiments, the antenna unit 140 may be formed of the above-mentioned metal or alloy, or may include a transparent metal oxide.

In some embodiments, the antenna unit 140 may include a mesh structure to improve transmittance. For example, the fourth radiator 142 and the fourth transmission line 144 may include the mesh structure.

In an embodiment, the fourth radiator 142 and the fourth transmission line 144 may include a solid structure. For example, a lower portion of the fourth radiator 142 and the fourth transmission line 144 may have the solid structure. In this case, the solid portion of the antenna unit 140 may be located in a non-display area of the display device.

In an embodiment, the fourth signal pad 146 and the fourth ground pad 148 may include the solid structure to reduce a feeding resistance and improve noise absorption efficiency and horizontal radiation properties.

In some embodiments, the antenna unit 140 may be spaced d apart from the first radiator group 110 and the second radiator group 120 by a distance of λ/2 or more. λ may be a wavelength corresponding to the lowest frequency among resonance frequencies of the antenna unit 140, the first radiator group 110 and the second radiator group 120. For example, the resonance frequency of the antenna unit 140 may be a frequency corresponding to the wavelength.

For example, a separation distance between the fourth radiator 142 and the first radiator 112 and a separation distance between the fourth radiator 142 and the second radiator 122 may be λ/2 or more. The separation distance may indicate the shortest straight linear distance between two radiators.

In this case, a sufficient separation distance between radiators covering frequencies of different bands may be achieved to suppress signal disturbance and interference, and to prevent deterioration of the motion sensing performance and signal properties of the antenna structure.

Figure 7:
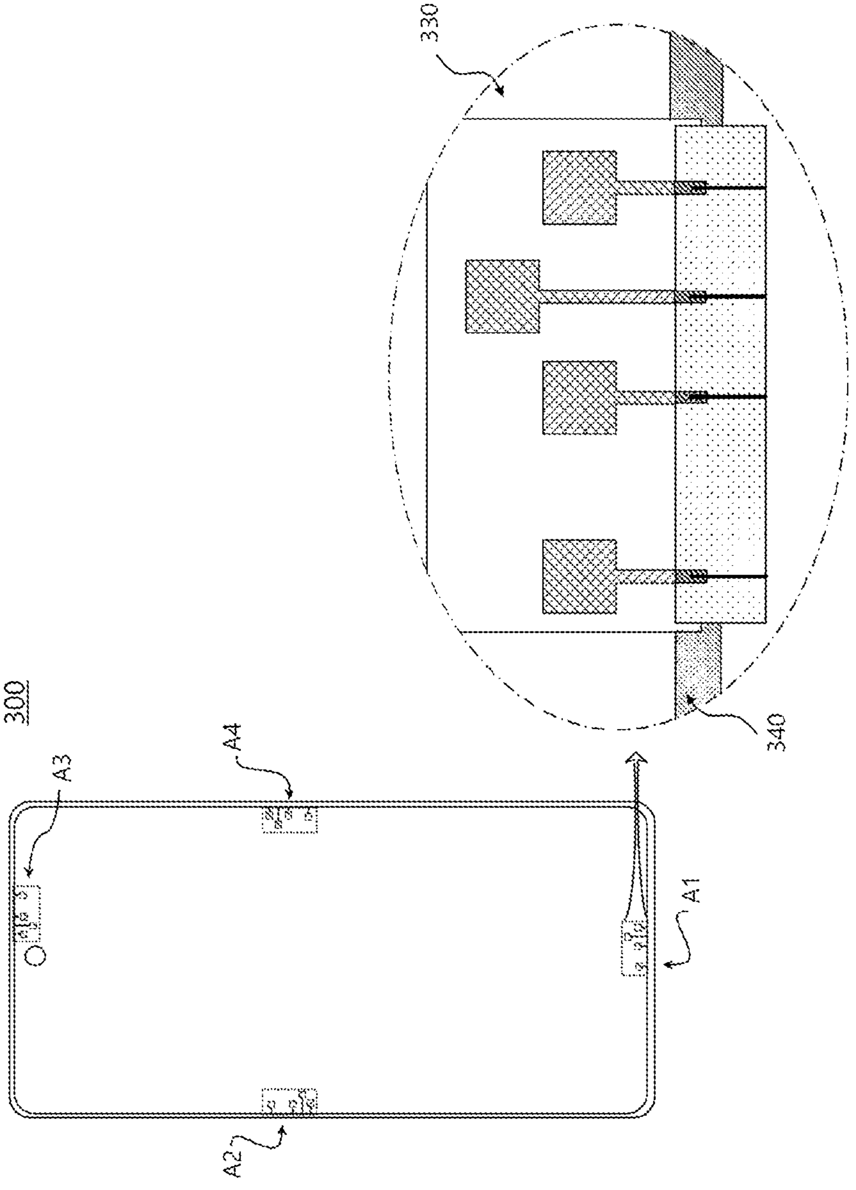
FIGS. 7 and 8 are a schematic plan view and a schematic cross-sectional view illustrating an image display device in accordance with exemplary embodiments.

FIG. 7 is a schematic plan view illustrating a display device in accordance with exemplary embodiments.

FIG. 7 shows a front portion or a window surface of a display device 300. The front portion of the display device 300 may include a display area 330 and a non-display area 340. The non-display area 340 may correspond to, e.g., a light-shielding portion or a bezel portion of an image display device.

The above-described antenna structure may be disposed toward the front portion of the display device 300, and may be disposed on, e.g., a display panel.

In some embodiments, the above-described antenna structure may be attached on the display panel in the form of a film.

In an embodiment, the antenna structure may be formed throughout the display area 330 and the non-display area 340 of the display device 300. In an embodiment, the radiators 112 and 122 may be at least partially superimposed over the display area 330.

In some embodiments, the antenna structure may be located at a central portion of one side of the display device. For example, the front portion of the display device may include a first area A1, a second area A2, a third area A3 and a fourth area A4 located at the central portions of four sides of the display device.

The antenna structure may be disposed at the first region, the second region, the third region or the fourth region of the display device 300, so that deterioration of the motion sensing performance at any one side may be prevented, and the motion, gesture or distance of the sensing object in all directions may be detected on the front portion.

Figure 8:
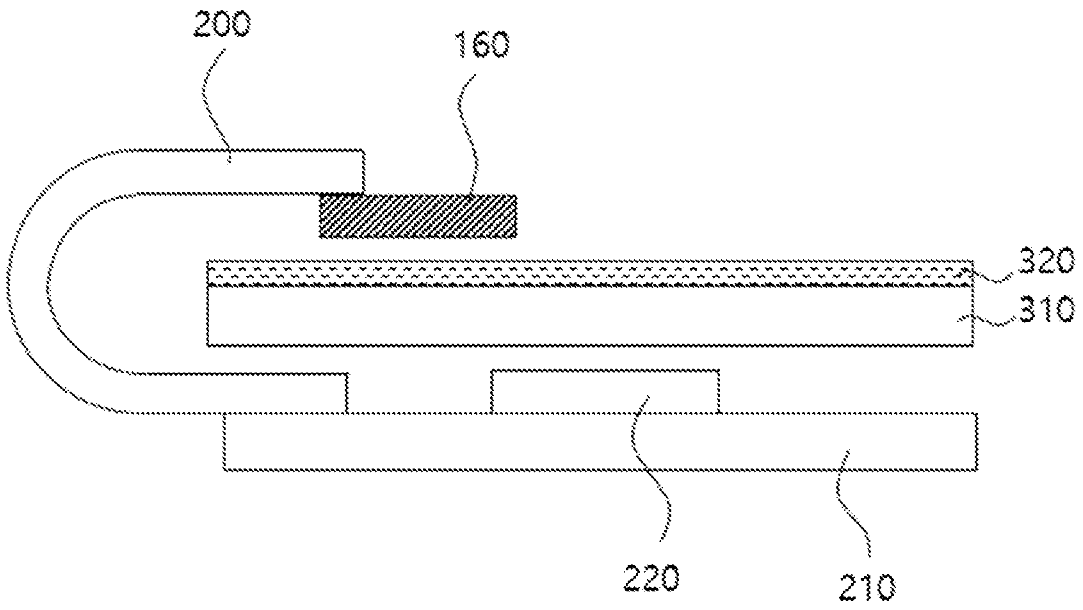

FIG. 8 is a schematic cross-sectional view illustrating a display device in accordance with exemplary embodiments.

Referring to FIG. 8, a display device 300 may include a display panel 310 and an antenna structure 160 disposed on the display panel 310.

In exemplary embodiments, an optical layer 320 may be further included on the display panel 310. For example, the optical layer 320 may be a polarization layer including a polarizer or a polarizing plate.

In an embodiment, a cover window may be disposed on the antenna structure 160. The cover window may include, e.g., glass (e.g., an ultra-thin glass (UTG)) or a transparent resin film. Accordingly, an external impact applied to the antenna structure 160 may be reduced or absorbed.

For example, the antenna structure 160 may be disposed between the optical layer 320 and the cover window. In this case, the dielectric layer 100 and the optical layer 320 disposed under the radiators 112 and 122 may serve as dielectric layers of the radiators 112 and 122 together. Accordingly, an appropriate permittivity may be achieved so that the motion sensing performance of the antenna structure 160 may be sufficiently implemented.

For example, the optical layer 320 and the antenna structure 160 may be laminated using a first adhesive layer, and the antenna structure 160 and the cover window may be laminated using a second adhesive layer.

For example, a flexible printed circuit board 200 may be bent along a lateral curved profile of the display panel 310 to be disposed at a rear portion of the display device 300 and extend to an intermediate circuit board 210 on which the driving IC chip is mounted (e.g., the main board).

The flexible printed circuit board 200 and the intermediate circuit board 210 may be bonded or connected to each other using a connector, so that the feeding to the antenna structure 160 and the antenna driving control by the driving IC chip may be implemented.

In some embodiments, a motion sensor driving circuit 220 may be mounted on the intermediate circuit board 210. In an embodiment, the motion sensor driving circuit 220 may be a proximity sensor, a gesture sensor, an acceleration sensor, a gyroscope sensor, a position sensor, a magnetic sensor, etc.

In some embodiments, the first radiator group 110 and the second radiator group 120 may be coupled to the motion sensor driving circuit 220. For example, the antenna structure 160 may be electrically connected to the motion sensor driving circuit 220 through the flexible circuit board 200 connected to the intermediate circuit board 210. Thus, signals sensed by the radiators 112 and 122 may be transmitted/provided to the motion sensor driving circuit 220.

In an embodiment, the change of the signal intensities of the first radiator group 110 and the second radiator group 120 based on a movement of the sensing object mat be detected to measure a positional change of the sensing object. For example, the motion sensor driving circuit 220 coupled with the antenna structure 160 may detect a motion by detecting a signal change corresponding to a movement of the sensing object.

For example, the first radiator group 110 may detect the movement of the sensing object in the first direction. The second radiator group 120 may detect the movement of the sensing object in the second direction. Thus, the change of the signal intensity according to the motion/position in the first axis and the second axis may be provided from the antenna structure 160 to the motion sensor driving circuit 220, and the motion and gesture along each axis may be measured in the motion sensor driving circuit 220.

In one embodiment, the motion sensor driving circuit 220 may a include motion detection circuit. Signal information transmitted from the antenna structure 160 may be converted/calculated into a location information or a distance information through the motion detection circuit.

In an embodiment, the antenna structure 160 may be electrically connected to a radar sensor circuit, and thus signal transmission/reception information may be transmitted to a radar processor. For example, the antenna structure 160 may be connected to the radar processor through a circuit board. Accordingly, a radar sensor including the antenna structure may be provided.

The radar sensor may analyze a transmission/reception signal to detect information about the sensing object. For example, the distance to the sensing object may be measured by radiating radio waves from the antenna structure and receiving the radio waves reflected by the sensing object.

For example, the distance of the sensing object may be calculated by measuring a time required for a signal transmitted from the antenna structure to be reflected by the sensing object and then received by the antenna structure again.

What is claimed is:

1. An antenna structure comprising:

a first radiator group comprising a plurality of first radiators arranged in a first direction, the first radiators having the same resonance frequencies;

a second radiator group comprising a plurality of second radiators arranged in a second direction perpendicular to the first direction, the second radiators having the same resonance frequencies;

first transmission lines connected to each of the first radiators at the same layer as that of the first radiators; and second transmission lines connected to each of the second radiators at the same layer as that of the second radiators; and a third radiator spaced apart from the first radiator group and the second radiator group, wherein the third radiator is disposed at only one side from the first radiator group of both sides from the first radiator group and the second radiator group, the third radiator serves as a transmission radiator, and the first radiator group and the second radiator group serve as reception radiators, wherein the first radiator group and the second radiator group share one radiator, and the shared radiator is disposed in an area where a first axis defined as an imaginary straight line passing through centers of the first radiators and extending in the first direction, and a second axis defined as an imaginary straight line passing through centers of the second radiators and extending in the second direction intersect each other.

2. The antenna structure according to claim 1, wherein the first radiator group and the second radiator group are disposed at the same layer.

3. The antenna structure according to claim 1, wherein the number of first radiators and the number of second radiators are the same.

4. The antenna structure according to claim 1, further comprising a dielectric layer on which the first radiator group and the second radiator group are disposed, wherein the first direction is inclined by a first tilting angle with respect to a length direction of the dielectric layer, and the second direction is inclined by a second tilting angle with respect to the length direction of the dielectric layer.

5. The antenna structure according to claim 4, wherein each of the first tilting angle and the second tilting angle is in a range from 30° to 60°.

6. The antenna structure according to claim 4, wherein the first radiator group comprises two first radiators, and the second radiator group comprises two second radiators.

7. The antenna structure according to claim 6, wherein a ratio of a length difference between the second transmission lines relative to a length difference between the first transmission lines is in a range from 0.8 to 1.2.

8. The antenna structure according to claim 4, further comprising:

a first signal pad electrically connected to one end portion of each of the first transmission lines; and a second signal pad electrically connected to one end portion of each of the second transmission lines.

9. The antenna structure according to claim 8, wherein the first signal pad and the second signal pad are arranged to form a single row in a third direction, and the first direction and the second direction are inclined by the first tilting angle and the second tilting angle, respectively, with respect to the third direction.

10. The antenna structure according to claim 1, wherein the first radiators and the second radiators have a mesh structure.

11. The antenna structure of claim 10, further comprising a dummy mesh pattern spaced apart from the first radiators and the second radiators around the first radiators and the second radiators.

12. The antenna structure according to claim 1, further comprising an antenna unit spaced apart from the first radiators and the second radiators, wherein the antenna unit has a resonance frequency different from that of the first radiators and the second radiators.

13. A motion recognition sensor comprising the antenna structure according to claim 1.

14. A radar sensor comprising the antenna structure according to claim 1.

15. A display device, comprising:

a display panel; and the antenna structure according to claim 1 disposed on the display panel.

16. The display device according to claim 15, wherein the first direction is inclined by a first tilting angle with respect to a length direction of the display panel, and the second direction is inclined by a second tilting angle with respect to the length direction of the display panel.

* * * * *